FREQUENCY MODULATION RECORD REPRODUCE SYSTEM
FOR TELEVISION SIGNALS
Filed March 4, 1965
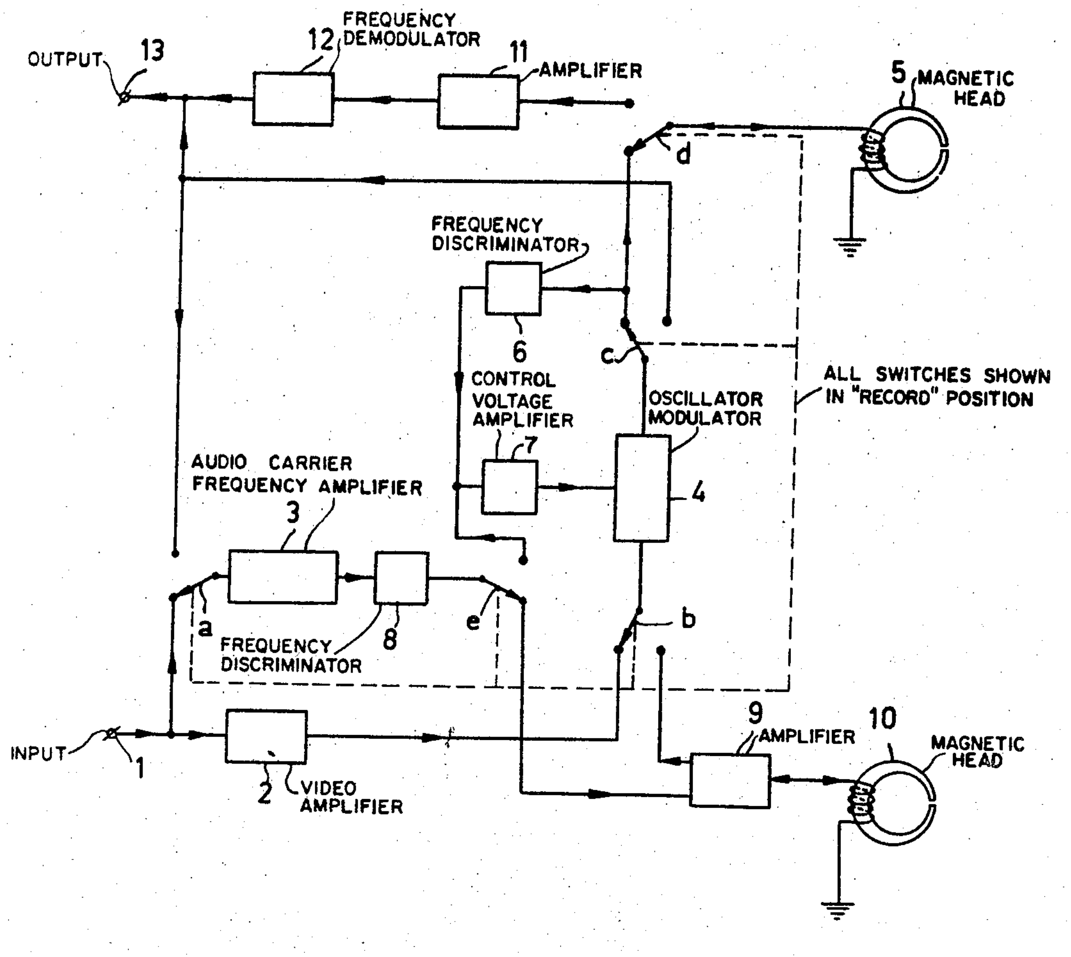
INVENTOR.
WILLEM VAN DEN BUSSCHE
BY
Frank R. Trifari
AGENT United States Patent Office 3,403,221

Patented Sept. 24, 1968

3,403,221
FREQUENCY MODULATION RECORD REPRODUCE SYSTEM FOR TELEVISION SIGNALS

Willem Van den Bussche, Emmasingel, Eindhoven, Netherlands, assignor to North American Philips Company Inc., New York, N.Y., a corporation of Delaware Filed Mar. 4, 1965, Ser. No. 437,193
Claims priority, application Netherlands, Mar. 4, 1964, 6402128
3 Claims. (Cl. 178—6.6)

ABSTRACT OF THE DISCLOSURE

A magnetic recording and reproducing circuit for use with television signals employing an oscillator modulator and a frequency discriminator for recording is provided with a switch for reconnecting the oscillator modulator and frequency discriminator together during playback, the frequency discriminator acting during playback to control the center frequency of the oscillator demodulator.

This invention pertains to the magnetic recording and reproduction of television signals and in particular to apparatus for magnetically recording and reproducing signals which include a video signal and a frequency-modulated audio signal.

In the magnetic recording of television signals, the video signal is usually first brought into frequency-modulated form by means of an oscillator-modulator before being recorded. In this manner, the recording and reproduction processes can be carried out substantially independently of frequency for the whole broad range of frequencies of the video signal. As is well-known, in the absence of frequency modulation, it is impossible for the lowest frequencies, especially the direct current component, of the video signal to be magnetically recorded. Another advantage of frequency-modulating the video signal is that the magnetic properties of the magnetic record carrier used for recording do not affect the demodulated reproduced signal.

The audio signal associated with the television signal is usually recorded in low-frequency form on a separate track of the magnetic record carrier. However, if the apparatus has been designed especially for cooperating with a television receiver from which the signals to be recorded are derived and by which the signals being read are displayed, the apparatus preferably has applied to it the intermediate-frequency or high-frequency video signal present in the television receiver; the reason for this is to avoid problems which occur in connection with the transmission of the D.C. component present in the video signal. The intermediate-frequency or high-frequency video signal also includes the associated audio signal in modulated, usually frequency-modulated, form. It is therefore necessary to demodulate the applied audio signal in a frequency discriminator included in the apparatus before the audio signal is actually recorded.

However, it is desirable that the reproduced signal be applied to the television receiver in as simple a manner as possible. To this end, the reproduced video and audio signals are added together so as to obtain a complete television signal compatible with the standard for the receiver. Such a television signal may be an intermediate-frequency signal or a high-frequency signal. When it is in the form of a high-frequency signal it is applied to the antenna input of the receiver and all of the amplifying stages of the receiver are thus used. The low-frequency audio signal obtained during reproduction is first modulated in frequency on a carrier wave and is then fed, together with the video signal, to the receiver. The carrier wave should have an exact, predetermined frequency corresponding to the resonance frequency of the associated filters in the television receiver. The apparatus must therefore include a frequency stable oscillator-modulator to accomplish the frequency modulation.

It is thus seen that apparatus used in combination with a television receiver for magnetically recording and reproducing television signals must include means for frequency-modulating the video signal and demodulating the audio signal during recording and means for demodulating the video signal and frequency-modulating the audio signal during reproduction.

It is a primary object of the invention to provide effective and economical apparatus for the magnetic recording and reproduction of television signals.

Among other objects of the invention are the following:

To provide magnetic recording and reproducing apparatus adapted to cooperate with a television receiver, which apparatus is capable of performing the various necessary modulating and demodulating functions effectively with a minimal number of components; and To provide magnetic recording and reproducing apparatus for television signals in which the functions of frequency-modulating the video signal and demodulating the audio signal during recording and demodulating the video signal and frequency-modulating the audio signal during reproduction may be performed in an efficacious and economical manner.

Briefly, in accordance with the invention, the same oscillator-modulator that is used for frequency-modulating the video signal during recording is used as a frequency-modulator for the reproduced audio signal, the center frequency of the oscillator-modulator during reproduction being controlled by means of a control circuit including the frequency discriminator used for demodulating the audio signal during recording.

In order that the invention may be readily carried into effect, it will now be described in detail, by way of example, with reference to the accompanying diagrammatic drawing.

The sole figure shows an input 1 to which the television signal to be recorded is applied after being demodulated. If the television signal is derived from an intermediate-frequency stage of a television receiver it comprises, for instance, a video carrier of 38.9 mc./s. on which the video-signal is modulated in amplitude, and an audio carrier of 33.4 mc./s. on which the audio-signal is modulated in frequency. After demodulation in a detector stage (not shown) a signal results which includes a video-signal as well as an audio-signal modulated in frequency on an audio carrier of 5.5 mc./s..

The television signal originating from the input is applied to both the input of a video-amplifier 2 and, through a switch section *a*, the input of an audio carrier-frequency amplifier 3 tuned to the audio carrier (5.5 mc./s.). The switch section *a*, together with the other switch sections shown, all of which are mechanically connected together, are shown in the position occupied during the recording process. They are switched to the other position during the reading process.

The video-signal is amplified in the video-amplifier 2 and subsequently applied through a switch section *b* to an oscillator-modulator 4 in which the video-signal is brought into the frequency-modulated form suitable for recording. The audio signal applied to the video-amplifier 2 is suppressed in it so that the signal cannot exert any detrimental influence on the operation of the modulator 4.

The frequency-modulated video-signal originating from the output of the oscillator-modulator 4 is passed on through two switch sections *c* and *d* and applied to a magnetic head 5 which serves to record the video-signal on a magnetic record carrier (not shown).

The output signal from the oscillator-modulator 4 is also applied through the switch-section *c* to a frequency discriminator 6 by means of which a direct control voltage is produced for control of the frequency of the oscillator-modulator. This control voltage is supplied to the oscillator-modulator after previous amplification in a control voltage amplifier 7.

The discriminator 6 may comprise, for example, a low-pass filter to the output of which a rectifier is connected and the cut-off frequency of which is chosen to be equal to the frequency which the oscillator-modulator must have during the occurrence of the synchronizing pulses in the video signal. If the oscillator must vary between, for example, 3.2 mc./s. (during the synchronizing pulses) and 4.4 mc./s. (during the periods of maximum brightness) the cut-off frequency of the filter is adjusted to 3.2 mc./s. The oscillator-modulator is further adjusted so that, in the absence of a control voltage at the output of the discriminator 6, it oscillates at a natural frequency which lies lower than the cut-off frequency of the filter (for example at 3 mc./s.). If the frequencies of the oscillator are unduly high the discriminator 6 does not provide a control voltage so that the frequencies of the oscillator shift to lower values. However, if these frequencies have decreased so far that during the synchronizing pulses the frequency lies lower than the limiting frequency of the filter, the discriminator 6 provides a control voltage by which the oscillator is again controlled to higher frequencies.

The frequency-modulated audio carrier applied through the switch-section *a* is amplified in the amplifier 3 and subsequently demodulated in a frequency-discriminator 8 which is tuned to the frequency of the audio carrier (5.5 mc./s.). The low-frequency audio signal originating from the said discriminator is applied through a switch section *e* and a recording and play-back audio-amplifier 9 to a magnetic head 10, by means of which the audio signal is recorded on a magnetic record carrier (not shown), preferably in a second track of the magnetic record carrier co-acting with the head 5.

During the reading process, the frequency modulated video-signal originating from the magnetic head 5 is applied through the switch section *d* to an amplifier 11 which, as the case may be, also limits amplitude modulations of the signal. The signal provided by amplifier 11 is subsequently demodulated in a frequency demodulator 12 and the resulting video-signal applied to an output 13.

The low-frequency audio signal provided by the magnetic head 10 during the reading process is amplified in the recording and play-back audio-amplifier 9 and subsequently applied through the switch section *b* to the input of the oscillator-modulator 4. This oscillator modulator which, as previously described, serves to modulate the video-signal during the recording process and, to this end, is active in the frequency range between, for example, 3.2 mc./s. and 4.4 mc./s., fulfils during the reading process the function of an oscillator-modulator for the audio signal at a centre-frequency which must be very accurately equal to the required frequency of the audio carrier (5.5 mc./s.). The manner in which this condition is fulfilled will be described further hereinafter. The frequency-modulated audio-signal provided by the oscillator-modulator is added through the switch section *c* to the video-signal applied to the output 13. The complete television signal obtained at the output 13 may be modulated by means of a high-frequency modulator, not shown, to, for example, a television channel located in a VHF-band. The resulting signal may then be applied without further to the aerial input of a television receiver.

In order that, during the reading process, the intermediate frequency of the oscillator-modulator 4 is accurately maintained at the required frequency of the audio carrier the output signal derived through the switch section *c* from the oscillator-modulator is applied through the switch section *a* to the input of amplifier 3 and through this amplifier to the discriminator 8. The output signal thereof is led through the switch section *e*, subsequently amplified and smoothed in the control-voltage amplifier 7 and then used as a control signal for the frequency control of the oscillator-modulator 4. Since the discriminator 8, as previously stated, is tuned to the frequency of the audio carrier, it does not provide a control voltage as long as the oscillator correctly oscillates on the frequency of the audio carrier. Deviations from the frequency of the oscillator cause a direct voltage at the output of the discriminator 8 by means of which such frequency deviations are compensated. It should be noted that even small deviations from the frequency of the oscillator cause a high control voltage since both the control-voltage amplifier 7 and the audio carrier-frequency amplifier 3 are included in the control circuit.

Thus a stable oscillator-modulator for the audio signal is obtained in the described manner, use being made only of component parts all of which are already available for the recording process in the device.

What I claim is:

1. Magnetic recording and reproducing apparatus for a television signal including a video signal and a frequency-modulated audio signal, comprising: means for applying said video signal to an oscillator-modulator and means for applying said frequency-modulated audio signal to a frequency discriminator during recording, transducing means for recording on a magnetic record carrier the frequency-modulated video signal from said oscillator-modulator and the demodulated audio signal from said frequency discriminator, and means for applying the demodulated audio signal from said record carrier to said oscillator-modulator during reproduction, the output of the oscillator-modulator during reproduction being applied to the frequency discriminator, the output of the frequency discriminator being applied to the oscillator-modulator for controlling its center frequency.

2. Magnetic recording and reproducing apparatus for a television signal including a video signal and a frequency-modulated audio signal, comprising: means for applying said video signal to an oscillator-modulator and means for applying said frequency-modulated audio signal to a frequency discriminator during recording, a first control circuit coupled from the output of the oscillator-modulator to an input thereof for controlling its frequency during recording, transducing means for recording on a magnetic record carrier the frequency-modulated video signal from said oscillator-modulator and the demodulated audio signal from said frequency discriminator, means for applying the demodulated audio signal from said record carrier to said oscillator-modulator during reproduction, and a second control circuit coupled from the output of the oscillator-modulator to an input thereof for controlling its center frequency during reproduction, said second control circuit including said frequency discriminator for controlling the center frequency of the oscillator-modulator.

3. Magnetic recording and reproducing apparatus for a television signal including a video signal and a frequency-modulated audio signal, comprising: means for applying said video signal to an oscillator-modulator and means for applying said frequency-modulated audio signal to an audio carrier frequency amplifier and a frequency discriminator during recording, a first control circuit coupled from the output of the oscillator-modulator to an input thereof for controlling its frequency during recording, transducing means for recording on a magnetic record carrier the frequency-modulated video signal from said oscillator-modulator and the demodulated audio signal from said frequency discriminator, means for applying the demodulated audio signal from said record carrier to said oscillator-modulator during reproduction, and a second control circuit coupled from the output of the oscillator-modulator to an input thereof for controlling its center frequency during reproduction, said second control circuit including said amplifier and said frequency discriminator for controlling the center frequency of the oscillator-modulator.

References Cited

UNITED STATES PATENTS

| | | | |
|---|---|---|---|
| 3,136,866 | 6/1964 | Barry | 178—6.6 |
| 3,312,782 | 4/1967 | Wessels | 178—6.6 |

ROBERT L. GRIFFIN, *Primary Examiner.*

H. W. BRITTON, *Assistant Examiner.*